Patented Sept. 23, 1952

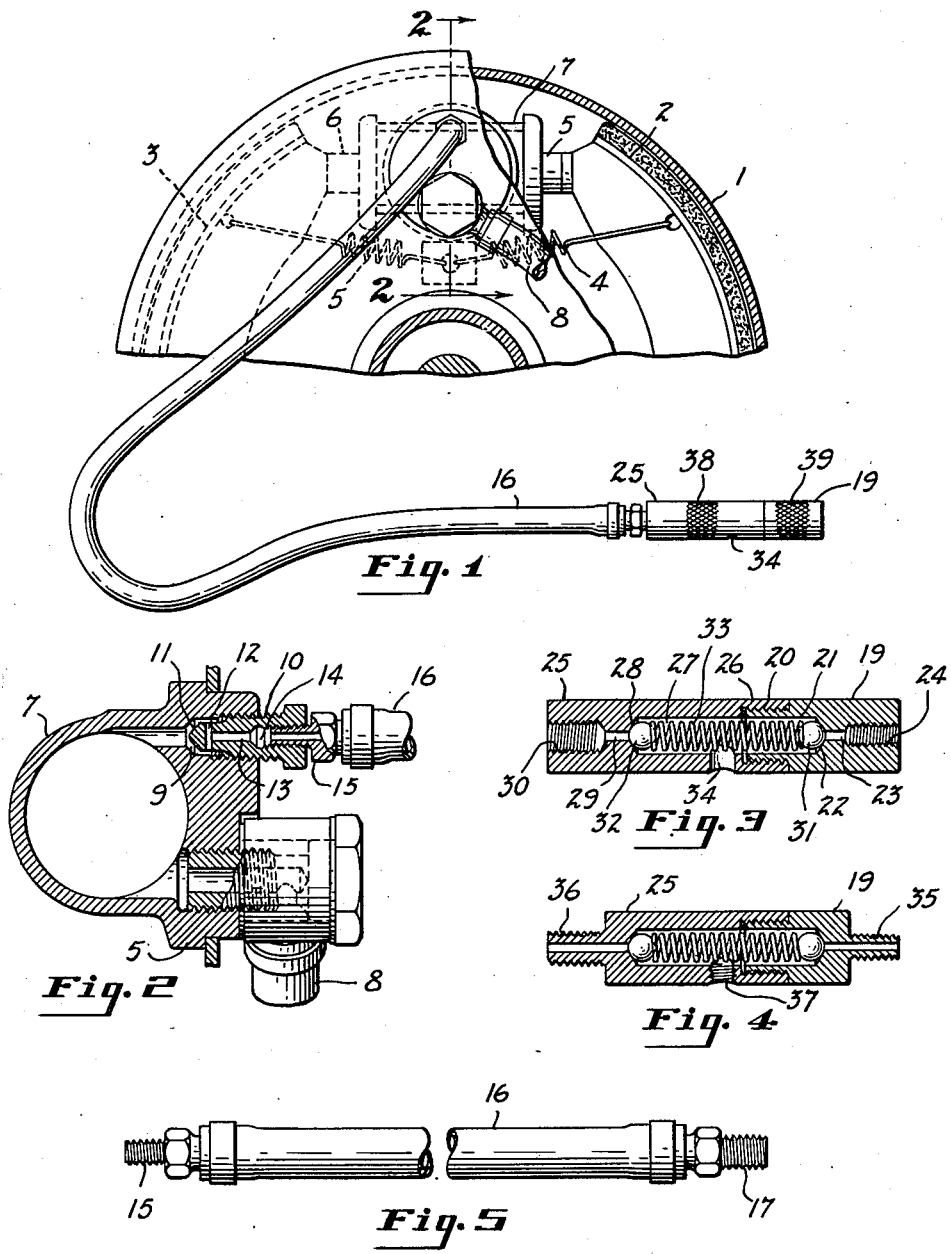

2,611,387

UNITED STATES PATENT OFFICE 2,611,387

VALVED TOOL FOR BLEEDING BRAKE CYLINDERS

Charles J. Legerski, Cleveland, Ohio, assignor of ten per cent to Lewis S. Ivanc, Cleveland, Ohio Application May 27, 1946, Serial No. 672,407

3 Claims. (Cl. 137—270)

My invention relates to a tool for bleeding brake cylinders and more particularly to a tool for this purpose that is simple in construction and which may be utilized to bleed brake cylinders provided with bleeder screws of two different standard sizes.

In hydraulic brake systems for automotive vehicles, it is well known that the presence of air in the brake operating cylinder prevents efficient operation of the brakes. To enable the air to be expelled from the system, it is the practice at the present time to provide each brake cylinder with a bleeder screw. Such bleeder screws are usually of two standard sizes, one size being standard for most cars while the other size is standard for trucks and airplanes, although in some cars the bleeder screws are of the same size as the bleeder screws on airplanes and trucks.

In servicing brakes, it is the practice to first open the bleeder screw. The mechanic then pumps the foot pedal to expel the air from the brake cylinder and his helper then tightens the bleeder screw to prevent the reentrance of air. Additional brake fluid may then be supplied if desired to the master cylinder. Such practice, however, requires the service of two men because if the mechanic releases the pressure on the brake pedal and then closes the bleeder screw, air will reenter the brake cylinder before he has an opportunity to close the bleeder screw.

It is an object of the present invention to provide an improved tool by means of which the brakes may be bled by one mechanic.

Another object of my invention is to provide a comparatively small tool for bleeding brake cylinders which may be utilized in bleeding air from brake cylinders in which the bleeder screws are of two different standard sizes.

A further object of my invention is to provide an improved tool for bleeding brake cylinders which may be constructed from readily fabricated parts and assembled for use by unskilled workmen and which may be readily disassembled to permit cleaning of the parts.

My invention will be better understood by reference to the accompanying drawings in which:

Fig. 1 is a fragmentary elevational view of a hydraulic brake system with parts in section and parts broken away and an elevational view of my improved tool and a hose having one end connected to said tool and its opposite end connected to the bleeder screw of a brake cylinder;

Fig. 2 is a cross sectional view on the line 2—2 of Fig. 1, looking in the direction of the arrows;

Fig. 3 is a cross sectional view of one form of my improved tool;

Fig. 4 is a cross sectional view of a modification of my improved tool; and

Fig. 5 is an elevational view of a hose which may be utilized in conjunction with my improved tool.

While my improved tool may be utilized for bleeding air from brake cylinders of cars, trucks or airplanes of any desired type, as illustrated in the drawings, a fragmentary portion of a car wheel is shown including a brake drum 1, a pair of brake shoes 2 and 3 which are normally held out of contact with the brake drum 1 by springs 4 and 5 and which are forced into engagement therewith by means of a brake liquid acting upon the ends of pistons 5 and 6. Pistons 5 and 6 reciprocate in a cylinder 7 to which liquid is supplied from a master cylinder, not shown, through a conduit 8. In operation when pressure is applied to the foot pedal, liquid is forced into the cylinder 7 and moves pistons 5 and 6 outwardly to actuate the brake shoes which are returned to their normal positions by the force of springs 4 and 5 when the pressure upon the pistons is released.

Air, however, has the tendency to accumulate in the brake cylinder which, being compressible, has the tendency to impair the efficiency of the brakes, and during servicing of the brakes, it is therefore desirable to bleed the air from the brake cylinders.

For this purpose, each brake cylinder has an internally threaded opening provided with a valve seat 9 to receive an externally threaded bleeder screw 10, the inner portion of which is bevelled as indicated by the numeral 11 to engage the valve seat 9 and close the opening when screw 10 is tightened. Bleeder screw 10 is also provided with a diametrically extending opening 12, which communicates with the brake cylinder when screw 10 is loosened, an internal bore 13 which communicates with the opening 12, and an enlarged counterbore 14 which is internally threaded. In normal operation, screw 11 is loosened and one end of a metal nipple 15 on a hose 16 is threaded to bleeder screw 10 to conduct air from the brake cylinder when the pedal is pumped during servicing of the brakes. It will be noted that hose 16 is provided with a small nipple 15 at one end which is adapted to be threaded into the internal bore of bleeder screw 10 when the internal threads of the bleeder screw are of a small standard size and with a larger nipple 17 at the opposite end which is adapted to engage the internal threads on the bleeder screw when the internal threads of the bleeder screw are of a larger standard size.

In accordance with my invention, I have provided an improved tool which may be connected to either end of hose 16 or which may be connected directly to the internal threads of bleeder screws of two standard sizes.

One form of my improved tool is shown in Figs. 1 and 3 of the drawing and comprises a hollow body 19 having a reduced portion provided with external threads 20, an internal bore 21 forming part of a central chamber, a valve seat 22, and an internal bore 23 of less diameter than bore 21 which communicates with the central chamber and an enlarged counterbore 24 provided with internal threads. The other hollow body 25 of my improved tool is provided with an internally threaded portion 26 which engages the external threads 20 on the portion 21 to form a smooth outer periphery and with an internal bore 27 arranged in alignment with bore 21 to form a central chamber. Portion 25 is also provided with a valve seat 28 which communicates through a bore 29 of small diameter with an enlarged counterbore 30 provided with internal threads. As illustrated in Fig. 3, valve parts 31 and 32, which as shown are preferably of the ball type, engage valve seats 22 and 28, respectively, and are held in seating engagement by resilient means, such as a spring 33, arranged in the central chamber. As shown, the portion 25 is provided with an aperture 34 through which air and any liquid which is bled from the brake cylinders may be removed.

In utilizing my improved tool for bleeding brake cylinders, the bleeder screw 10 may be loosened in the usual manner and nipple 15, which is attached to one end of a hose 16 is threaded into the bleeder screw as shown in Fig. 2. The nipple 17 on the other end of hose 16 is then threaded into the internal threads 30 of my improved tool and when the mechanic pumps the brake pedal, air and entrained liquid are forced through the hose 16 and the pressure of the air and liquid unseat valve 32 which permits the liquid and air to be expelled through opening 34. When the mechanic releases the brake pedal, however, spring 33 forces valve part 32 against valve seat 28, thus preventing the reentrance of air into the brake cylinder. The mechanic then tightens screw 10 to retain the liquid in the brake cylinder and prevent the reentrance of air. The hose may then be removed from the bleeder screw.

It will be particularly noted that the threaded bore 30 is larger than threaded bore 24, and in fabricating my improved tool, bore 30 is formed to correspond to the internally threaded bore of a bleeder screw of one standard size while bore 24 is formed to correspond to the internally threaded bore of a bleeder screw of a smaller standard size. When nipple 15 is threaded into the internal bore of a bleeder screw of a small standard size as shown in Fig. 2, nipple 17 at the opposite end of the hose may be threaded into bore 30. When the bleeder screw has an internally threaded bore of a larger size, such as is used in trucks, airplanes, and some cars, the nipple 17 of the hose may be threaded into the internal bore of the bleeder screw and the nipple 15 into the internally threaded bore 24 of my improved tool and the brake cylinder may then be bled in the manner previously specified. One of my improved tools may therefore be utilized to bleed brake cylinders provided with internally threaded bleeder screws of two different standard sizes.

Another modification of my improved tool is shown in Fig. 4 of the drawing which is similar to that shown in Fig. 3 with the exception that instead of providing internally threaded bores 24 and 30, externally threaded nipples 35 and 36 are provided, the nipple 35 being of a size to be threaded into the internal bore of a small standard size bleeder screw, such as shown in Fig. 2, and nipple 36 being of a size to be threaded into the internally threaded nipple of a bleeder screw of a larger standard size, such as are provided in trucks, airplanes, and some cars. In the modification shown in Fig. 4, the opening 37 is internally threaded to receive the nipple 15 of hose 16 so that liquid expelled during the pumping of the brake may be conducted away from the vehicle. The other parts of the tool are similar to those shown in Fig. 3 and consequently have been designated by the same reference numerals.

It will be noted that my improved tool is simple in construction and the parts may be fabricated and assembled in an easy manner by unskilled workmen and for this purpose, bodies 19 and 25 may be knurled as indicated by the numerals 38 and 39. To clean the tool, parts 19 and 25 may be unthreaded which enables balls 31 and 32 and spring 33 to be removed, and after the parts have been cleaned, they may be readily reassembled for use.

What I claim is:

1. A small portable tool for use in servicing brakes, said tool being composed of first and second interfitting parts which may be removed from each other to enable the interior portion of the tool to be cleaned, each of said tool parts having a cylindrical bore and an outer cylindrical surface of the same size as the other tool part and the cylindrical surface of each of said parts being free from external projections so that the tool may be readily grasped by the fingers of an operator, the cylindrical bore in each of said tool parts being in alignment with each other to form a central cylindrical chamber when the tool parts are in interfitting engagement with each other, and each of said tool parts having a second bore communicating with the central chamber and extending from the central chamber to its free end, each of said second bores being of less diameter than the central chamber and each being of the same diameter at their entrance to the central chamber and each of said tool parts having a valve seat arranged between its second bore and the central chamber, a valve part of less diameter than the central chamber arranged to engage one of said seats and a second valve part of less diameter than the central chamber arranged to engage the other valve seat, a spring of less diameter than the central chamber arranged in the central chamber and having one end engaging one of said valve parts and its other end engaging the other valve part and normally maintaining both of said valve parts in engagement with its respective seat, each of said tool parts being provided with an integral threaded fitting through which the second bore of each tool part extends, one of said threaded fittings being of a size larger than the other fitting so that said tool may be fitted to couplings of two different sizes, and one of said tool parts being provided with an opening leading from the central chamber to the external surface of said tool which terminates flush therewith for permitting the liquid and entrained air entering the central chamber through one of said second bores to force one of the valve parts from its seat to enter the central chamber and to be drained from the central chamber of said tool.

2. A small portable tool for use in servicing brakes, said tool being composed of first and second interfitting parts which are removable from each other to enable the interior portion of the tool to be cleaned, each of said tool parts having a cylindrical bore and an outer cylindrical surface of the same size as the other part and the cylindrical surface of each of said parts being free from external projections throughout their entire length so that the tool may be readily grasped by the fingers of an operator, the cylindrical bore in each of said tool parts being in alignment with each other to form a central cylindrical chamber when the tool parts are in interfitting engagement with each other, and each of said tool parts having a second bore communicating with the central chamber and extending from the central chamber to its free end, each of which is of less diameter than the central chamber throughout its length and each of said bores being enlarged at a spaced distance from the central chamber and one being provided with internal threads over its enlarged part to engage a threaded fitting of a brake cylinder of one size and the other being enlarged at a spaced distance from the central chamber and being provided with internal threads of a larger size than the internal threads in the other bore to receive a threaded fitting of a brake cylinder of a different size, a valve part of less diameter than the central chamber arranged to engage one of said seats and a valve part of less diameter than the central chamber arranged to engage the other seat, a spring of less diameter than the central chamber arranged in the central chamber and having one of its end engaging one of said valve parts and its other end engaging the other valve part and normally maintaining both of said valve parts in engagement with its respective seat, and one of said tool parts being provided with an opening leading from the central chamber to the external surface of said tool which terminates flush therewith for permitting liquid and entrained air entering the central chamber through one of said second bores to force one of the valve parts from its seat to enter the central chamber and to be drained from the central chamber of said tool.

3. A small portable tool for use in servicing brakes, said tool being composed of first and second interfitting parts which are removable from each other to enable the interior portion of the tool to be cleaned, each of said tool parts having a cylindrical bore and an outer cylindrical surface of the same size as the other tool part, and the cylindrical surface of each of said parts being free from external projections so that the tool may be readily grasped by the fingers of an operator, the cylindrical bore in each of said tool parts being in alignment with each other to form a central cylindrical chamber when the tool parts are in interfitting engagement with each other, and each of said tool parts having a second bore communicating with the central chamber and extending from the central chamber to its free end, each of which second bores is of less diameter than the central chamber and each being of the same diameter throughout its length and each of said tool parts having a valve seat between its second bore and the central chamber, said first tool part having an externally threaded nipple through which its second bore extends and the second tool part being provided with an externally threaded nipple through which its second bore extends and one of the externally threaded nipples being larger than the other nipple so that it may be secured to the threaded fitting of a brake cylinder having a larger size than the first nipple, thereby enabling brake cylinders of two different sizes to be serviced by a single tool, a valve part of less diameter than the central chamber arranged to engage one of said valve seats and a valve part of less diameter than the central chamber to engage the other valve seat, a spring of less diameter than the central chamber arranged in the central chamber having one end engaging one of said valve parts and its other end engaging the other valve part and normally maintaining both of said valve parts in engagement with its respective seat, and one of said tool parts being provided with a threaded opening leading from the central chamber to the external surface of said tool which terminates flush therewith to permit a hose to be connected thereto to drain away liquid and entrained air from the central chamber which enters the central chamber through one of said tool parts against the force of said spring.

CHARLES J. LEGERSKI.

REFERENCES CITED

The following references are of record in the file of this patent:

UNITED STATES PATENTS

| Number | Name | Date |
| --- | --- | --- |
| 12,966 | Stoddart | May 29, 1855 |
| 1,582,928 | Hoag | May 4, 1926 |
| 1,673,247 | Keith | June 12, 1928 |
| 1,958,155 | Watkins | May 8, 1934 |
| 2,009,433 | Carroll | July 30, 1935 |
| 2,069,606 | Gary | Feb. 2, 1937 |
| 2,138,988 | Thomas | Dec. 6, 1938 |
| 2,360,839 | Barksdale | Oct. 24, 1944 |